3,159,636
1-AMINO-4-(XANTHENYL AND THIOXAN-
THENYL) PIPERAZINES
Peter Yonan, Chicago, and John W. Cusic, Skokie, Ill.,
assignors to G. D. Searle & Co., Chicago, Ill., a corporation of Delaware
No Drawing. Filed July 5, 1963, Ser. No. 293,141
4 Claims. (Cl. 260—268)

The present invention relates to a group of compounds which are 1-aminopiperazines and which also contain the xanthene or thioxanthene structures. More particularly, it relates to compounds having the following general formula

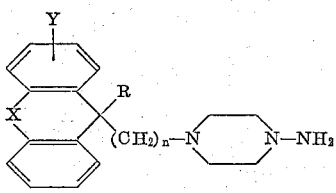

wherein X is an element of group VI of the periodic table of an atomic weight less than forty; Y is selected from the group consisting of hydrogen, methyl, and halogen; R is selected from the group consisting of hydrogen and lower alkyl; and n is a whole number between zero and two inclusive.

The halogen radicals referred to above include fluorine, chlorine, bromine, and iodine. The lower alkyl radicals referred to above contain up to six carbon atoms and can be illustrated by radicals such as methyl, ethyl, propyl, and butyl. X can be either O or S so that the compounds under discussion are either substituted xanthenes or substituted thioxanthenes.

The compounds of this invention are useful because of their pharmacological properties. In particular, they are useful as anti-ulcer agents and this is demonstrated by their inhibition of ulceration in the Shay rat. They also possess anti-inflammatory activity which is demonstrated by their phenylbutazone-like effect on edematous conditions. They also possess activity as mild depressants of the central nervous system. In addition, they possess anti-bacterial, anti-fungal and similar activities. Thus they inhbit the growth of the organisms Diplococcus pneumoniae, Trichophyton mentagrophytes, and Chlorella vulgaris and they inhibit germination of seeds of trifolium and poaceae.

The organic bases of this invention form pharmaceutically acceptable, non-toxic, acid addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic, and aromatic sulfonic acids. Among such esters are methyl chloride and bromide, ethyl chloride, dimethyl sulfate, and methyl benzenesulfonate.

The compounds of the present invention are prepared by reduction of the corresponding 4-substituted 1-nitrosopiperazine. Lithium aluminum hydride is a reagent particularly useful for this purpose. The intermediate nitroso compounds referred to above are obtained by heating the appropriate xanthen-9-ol with 1-nitrosopiperazine in an inert solvent such as toluene in the presence of an acid such as acetic acid.

When n is an integer greater than zero, an alternate procedure is used. In this case, the appropriate acid chloride, such as xanthen-9-carbonyl chloride, is reacted with 1-nitrosopiperazine to give the corresponding 4-amide which is then reduced to the desired compound. Again, lithium aluminum hydride is a preferred reducing agent for this purpose since this reagent reduces both the amide group and the nitroso group.

The compounds which constitute this invention and their preparation will appear more fully from a consideration of the following examples which are given for the purpose of illustration only and are not to be construed as limiting the invention in spirit or in scope. In these examples, quantities are in parts by weight and temperatures are in degrees centigrade (° C.).

EXAMPLE 1

A mixture of 20 parts of xanthen-9-ol, 12 parts of 1-nitrosopiperazine, and 6 parts of glacial acetic acid in 110 parts of toluene is refluxed for sixteen hours in an apparatus equipped with a water trap. The reaction mixture is cooled and the solvent evaporated to leave a crystalline residue. This residue is crystallized from a mixture of benzene and hexane to give 1-nitroso-4-(9-xanthenyl)piperazine melting at about 182–183° C.

A solution of 22 parts of 1-nitroso-4-(9-xanthenyl)-piperazine in 280 parts of tetrahydrofuran is added portionwise to a suspension of 6 parts of lithium aluminum hydride in 350 parts of tetrahydrofuran. The mixture is then refluxed for one hour and cooled and decomposed by the cautious dropwise addition of water. The reaction mixture is then filtered to remove the inorganic salts and the solvent is removed from the filtrate under reduced pressure to give a crystalline residue. This residue is recrystallized from hexane to give 1-amino-4-(9-xanthenyl)piperazine melting at about 136–137° C. This compound has the following formula

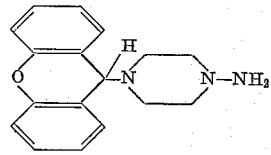

EXAMPLE 2

An equivalent quantity of thioxanthen-9-ol is substituted for the xanthen-9-ol and the procedure of Example 1 is repeated. In this case the intermediate compound is 1-nitroso-4-(9-thioxanthenyl)piperazine melting at about 158–163° C. after crystallization from a mixture of benzene and hexane. The final product is 1-amino-4-(9-thioxanthenyl)piperazine and it melts at about 148–149° C. after recrystallization from a mixture of benzene and hexane. This compound has the following formula

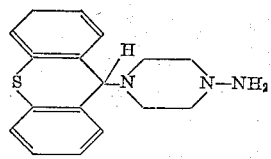

EXAMPLE 3

2-chloroxanthen-9-ol is reacted with 1-nitrosopiperazine in the manner described in Example 1. The product is 1-nitroso-4-(2-chloro-9-xanthenyl)-piperazine. Reduction of this crude material (melting point about 120–125° C.) with lithium aluminum hydride according to the procedure described in Example 1 gives 1-amino-4-(2-chloro-9-xanthenyl)piperazine.

In a similar manner, 4-methylxanthen-9-ol reacts with 1 - nitrosopiperazine to give 1 - nitroso-4-(4-methyl-9-xanthenyl)piperazine which is then reduced with lithium aluminum hydride to give 1-amino-4-(4-methyl-9-xanthenyl)piperazine.

EXAMPLE 4

An equivalent quantity of 9-methylxanthen-9-ol is substituted for the xanthen-9-ol and the procedure of Example 1 is repeated. The first product obtained is 1-nitroso-4-(9-methyl-9-xanthenyl)piperazine which is then reduced with lithium aluminum hydride to give 1-amino-4-(9-methyl-9-xanthenyl)piperazine.

EXAMPLE 5

To a mixture of 36 parts of triethylamine and 225 parts of chloroform there is added portionwise a solution of 25 parts of xanthene-9-carbonyl chloride in 75 parts of chloroform. This is followed by the portionwise addition of a solution of 13 parts of 1-nitrosopiperazine in 30 parts of chloroform. The resultant mixture is then refluxed for 3.5 hours, cooled, washed with water, and dried. The solvent is removed under reduced pressure to give 1-nitroso-4-(9-xanthenecarbonyl)piperazine.

Reduction of 11 parts of the above nitroso compound with 10 parts of lithium aluminum hydride according to the procedure described in Example 1 gives 1-amino-4-(9-xanthenylmethyl)piperazine. This compound has the following formula

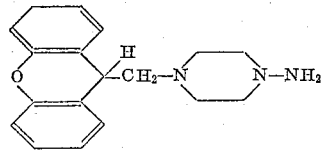

EXAMPLE 6

If an equivalent quantity of 9-xantheneacetyl chloride is substituted for the xanthene-9-carbonyl chloride and the procedure of Example 5 is repeated, there is first obtained 1-nitroso-4-(9-xantheneacetyl)-piperazine which is then reduced with lithium aluminum hydride to give 1-amino-4-[2-(9-xanthenyl)ethyl]-piperazine.

EXAMPLE 7

The reaction of 9-ethylxanthen-9-ol with 1-nitrosopiperazine according to the procedure described in Example 1 gives 1-nitroso-4-(9-ethyl-9-xanthenyl)-piperazine. This is then reduced with lithium aluminum hydride to give 1-amino-4-(9-ethyl-9-xanthenyl)-piperazine.

What is claimed is:

1. A compound of the formula

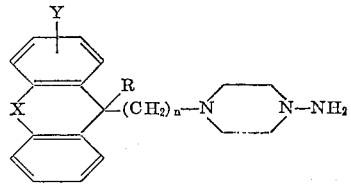

wherein X is an element of group VI of the periodic table of an atomic weight less than 40; Y is selected from the group consisting of hydrogen, chlorine, and methyl; R is selected from the group consisting of hydrogen and lower alkyl; and $n$ is a whole number between zero and two inclusive.

2. 1-amino-4-(9-xanthenyl)piperazine.
3. 1-amino-4-(9-thioxanthenyl)piperazine.
4. 1-amino-4-(9-xanthenylmethyl)piperazine.

References Cited in the file of this patent

UNITED STATES PATENTS 2,985,653    Jacob et al. _____ May 23, 1961

FOREIGN PATENTS 925,538    Great Britain _____ May 8, 1963
1,002 M    France _____ Dec. 18, 1961

OTHER REFERENCES

Winthrop et al.: Journal Organic Chemistry, vol. 27, pp. 230–235 (1962).